May 5, 1936.  E. KLINGLER  2,040,051
METHOD AND MEANS FOR PREPARING REFRACTORIES
AND REFRACTORY MASSES SO PRODUCED
Filed Nov. 1, 1933
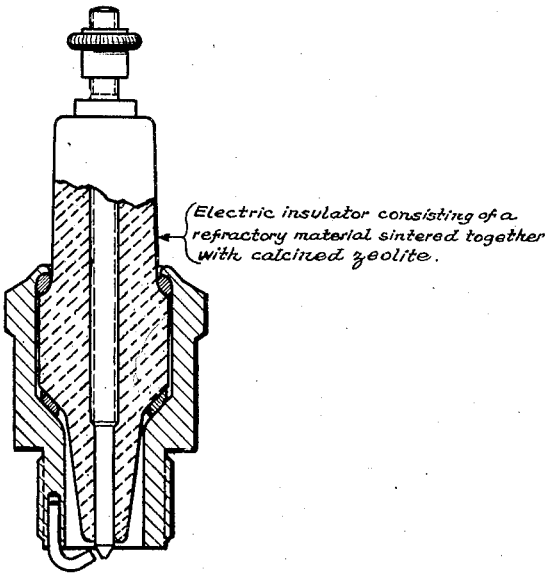
Electric insulator consisting of a refractory material sintered together with calcined zeolite.
Inventor
Emil Klingler
By Steward & McKay
Attorneys Patented May 5, 1936

2,040,051

UNITED STATES PATENT OFFICE 2,040,051

METHOD AND MEANS FOR PREPARING REFRACTORIES AND REFRACTORY MASSES SO PRODUCED

Emil Klingler, Zuffenhausen, Germany, assignor to Robert Bosch Aktiengesellschaft, Stuttgart, Germany Application November 1, 1933, Serial No. 696,293
In Germany November 10, 1932

20 Claims. (Cl. 123—169)

This invention relates to methods and means for preparing refractories and refractory masses so produced.

Highly refractory natural or artificial ceramic materials, such as refractory silicates (e. g. sillimanite), oxids, (e. g. corundum, magnesium oxid or chromium oxid), carbides, (e. g. silicon carbide) inter alia, can be bonded to form bodies of a definite shape with the aid of so-called fluxes; these fluxes melt at a comparatively low temperature and thereby cement together the separate particles of the highly refractory material.

The fluxes generally employed are either silicic acid salts, such as alkaline—and alkaline-earth silicates or feldspar, or metallic oxides of all kinds, which with other constituents of the mass produce compounds easily melting at a low temperature and therefore act indirectly as fluxes (so-called flux formers).

These fluxes however have a great influence upon the properties of the masses sintered by them, and even small quantities of them generally greatly reduce the properties of refractoriness, stability to changes of temperature, electrical resistance at high temperatures, mechanical strength, and so forth. It has therefore been attempted to bond highly refractory substances, such as corundum, by sintering without the aid of any fluxing material to form bodies of definite shape.

Such "sintered" bodies behave almost like the pure initial material, the sintering softens the separate crystals only on their surfaces to such an extent that they can unite on all sides with the adjacent surfaces, and therefore the properties of the oxid employed are maintained.

The temperatures necessary for such sintering are, however, generally very high and according to the purity of the material used come near its melting point. The reason for this is that diffusion in solid bodies to a sufficient extent to effect union between the crystal faces takes place only just below the melting point. Also the shaping of masses which must be formed by pressing or casting, is extremely difficult in the absence of any plastic constituent and must be limited in most cases to the simplest shapes.

It has now been found that improved results can be obtained by sintering highly refractory oxids in admixture with calcined zeolites. Under the term "zeolite" is included natural zeolites as well as artificial zeolites or so called "permutites". Examples of these are alkaline or alkaline earth aluminum hydro silicates or titanates or magnesium aluminum hydro silicates or iron aluminum hydro silicates. These and other known zeolites whether natural or artificial may be employed according to this invention or the separate constituents of such zeolites which undergo zeolite formation on heating may be used. In the latter case the constituents, alone or after mixing with the refractory materials, are heated to a suitable temperature below the sintering temperature of the refractories for a sufficient time to form a zeolite or a zeolitic glass. On further heating the refractory material sinters by the action of this glass. The finished burnt mass has nearly the same properties as the highly refractory material sintered without any binding material. Experiments have shown that the proportion by weight of the sintering material should preferably not substantially exceed 20% and not fall substantially below 3%.

Probably, the labile structure of such zeolites or permutites, which even in the calcined state have retained the exchangeability of the separate constituents, causes a particularly intensive action on the crystal faces of the refractory material, so that these surfaces are roughened and cemented even at low temperatures without a glassy or crystalline phase being simultaneously formed in which the crystals of the highly refractory material are, as it were, embedded, and which largely determines the properties of the ceramic body. Furthermore, any interstices present between the separate crystals are filled by a frame-like or skeleton-like rigid mass of the sintering material, which has no influence on the properties of the ceramic body. This frame-like rigid amorphous mass also no longer gives on re-heating a coherent glass phase of low softening point, as the electrical resistance when employing magnesium and alkaline earth zeolites is high even at high temperatures. Also the stability to sudden changes in temperature and the mechanical strength is nearly the same as in the masses sintered without any cementing or binding material.

By way of illustration, the following examples show how the invention may be practiced but the invention is not limited thereto.

*Example 1.*—Sodium chabazite, a naturally occurring sodium aluminate-hydrosilicate of the formula

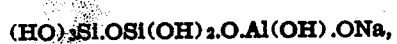

is treated with a solution of magnesium sulfate and thus converted into magnesium chabazite by base exchange, sodium sulfate going into solution.

This sodium sulfate is removed by washing and centrifuging or filtering and the pure magnesium chabazite remaining is lightly calcined.

5 parts of the magnesium chabazite thus formed and calcined are mixed with 95 parts of corundum and the mixture sintered to produce a bonded refractory.

*Example 2.*—Artificial zeolites can be prepared by fusing together aluminum oxid, silica (or titanium oxid) and alkali or alkaline earth metal oxide, or hydroxide or carbonate. Thus when kaolin is melted with quartz and alkali or alkalin earth carbonate a glass is formed. This is broken up into granules and extracted with water whereupon it changes slowly into a zeolite by absorption of water; at the same time the water removes any free alkali silicate which may have been formed.

The resulting zeolite is lightly calcined and 8 parts mixed with 92 parts of corundum to form a product which may be sintered into a valuable refractory.

*Example 3.*—The zeolite may be formed in some cases during the sintering of the refractory. Thus a glass is formed by fusing, 62 parts of chalk with 38 parts of aluminum oxide. 5 parts of this glass are mixed with 85 parts of corundum, 2.2 parts lithium carbonate and 7.8 parts of kaolin of Zettlitz. On sintering, this mixture the components of the zeolite unite and form a bond for the corundum.

One form of refractory embodying this invention is illustrated, by way of example, in the accompanying drawing in which the single figure shows a spark plug having an electric insulator embodying this invention.

I declare that what I claim is:

1. For the production of sintered refractories, a ceramic mass containing refractory material and calcined zeolite.

2. For the production of sintered refractories, a ceramic mass containing refractory material and components of a zeolite.

3. For the production of sintered refractories, a ceramic mass containing refractory oxid material and calcined zeolite.

4. For the production of sintered refractories, a ceramic mass containing refractory material and up to 20% of calcined zeolite.

5. For the production of sintered refractories a ceramic mass containing corundum and calcined zeolite.

6. For the production of sintered refractories, a ceramic mass containing over 80% of corundum and up to 20% of calcined zeolite.

7. Process for the production of refractories which consists in mixing refractory material with calcined zeolite, forming shapes from the mixtures so obtained and then sintering said shapes.

8. Process for the production of refractories which includes the steps of mixing refractory material with the components of a zeolite, bringing about the formation of zeolite from said components by maintaining the mixture so obtained at a high temperature below the sintering temperature of the refractory material and sintering said mixture.

9. Process for the production of refractories which consists in mixing refractory material with up to 20% of calcined zeolite, forming shapes from the mixture so obtained and then sintering said shapes.

10. Process for the production of refractories which includes the step of sintering a refractory material together with a zeolite.

11. A sintered refractory containing zeolite.

12. A sintered oxid refractory containing zeolite.

13. A sintered corundum refractory containing zeolite.

14. A sintered refractory containing up to 20% of zeolite.

15. A sintered refractory consisting of at least 80% of corundum and the balance mainly zeolite.

16. An electric insulator consisting of a ceramic mass containing refractory material and calcined zeolite.

17. An electric insulator consisting of a ceramic mass containing refractory material and components of a zeolite.

18. An insulator for spark plugs consisting of a ceramic mass containing fused alumina (corundum) and calcined zeolite.

19. An insulator for spark plugs consisting of a ceramic mass containing fused alumina (corundum) and components of a zeolite.

20. A spark plug having as insulator a ceramic mass containing refractory oxid and calcined zeolite.

EMIL KLINGLER.